(12) United States Patent
Wagner

(10) Patent No.: US 7,703,744 B2
(45) Date of Patent: Apr. 27, 2010

(54) CORE PUSH-IN SEAL

(75) Inventor: John B. Wagner, Greenfield, IN (US)

(73) Assignee: Freudenberg-NOK General Partnership, Plymouth, MI (US)

(*) Notice: Subject to any disclaimer, the term of this patent is extended or adjusted under 35 U.S.C. 154(b) by 82 days.

(21) Appl. No.: 11/681,761

(22) Filed: Mar. 3, 2007

(65) Prior Publication Data

US 2008/0210897 A1 Sep. 4, 2008

(51) Int. Cl.
*F16K 31/02* (2006.01)
(52) U.S. Cl. .................. 251/129.15; 251/358
(58) Field of Classification Search ............ 251/129.07, 251/129.15, 356, 358
See application file for complete search history.

(56) References Cited

U.S. PATENT DOCUMENTS

| 5,193,577 | A | * | 3/1993 | de Koning | 137/516.29 |
| 5,467,961 | A | * | 11/1995 | Sausner et al. | 251/129.15 |
| 6,029,903 | A | * | 2/2000 | Fukano et al. | 239/119 |
| 6,666,429 | B2 | * | 12/2003 | Fukano et al. | 251/129.04 |
| 7,143,956 | B2 | * | 12/2006 | Fukano | 239/119 |
| 7,337,805 | B2 | * | 3/2008 | Brown et al. | 137/625.33 |

* cited by examiner

*Primary Examiner*—John K Fristoe, Jr.
(74) *Attorney, Agent, or Firm*—Ronald W. Wangerow; Harness, Dickey & Pierce, P.L.C.

(57) ABSTRACT

A solenoid valve may include a housing, a solenoid coil, and a plunger. The solenoid coil may be disposed about an external portion of the housing and the plunger may be slidably disposed within the housing. The plunger may include a recess in a first end thereof having a seal assembly located and retained therein through a mechanical engagement therewith.

20 Claims, 3 Drawing Sheets

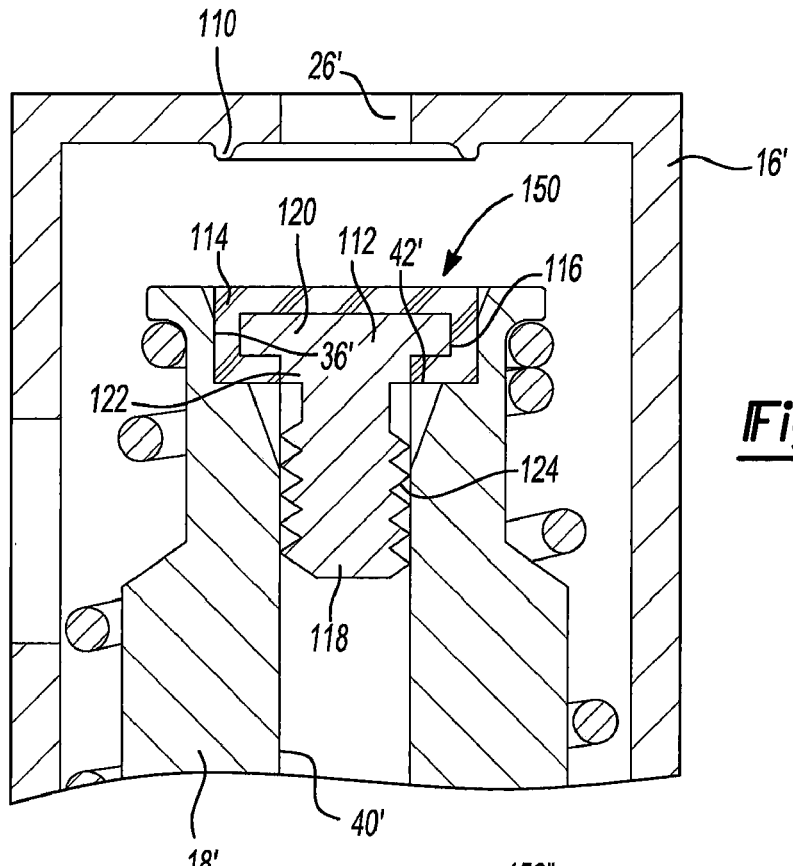
*Fig-2*
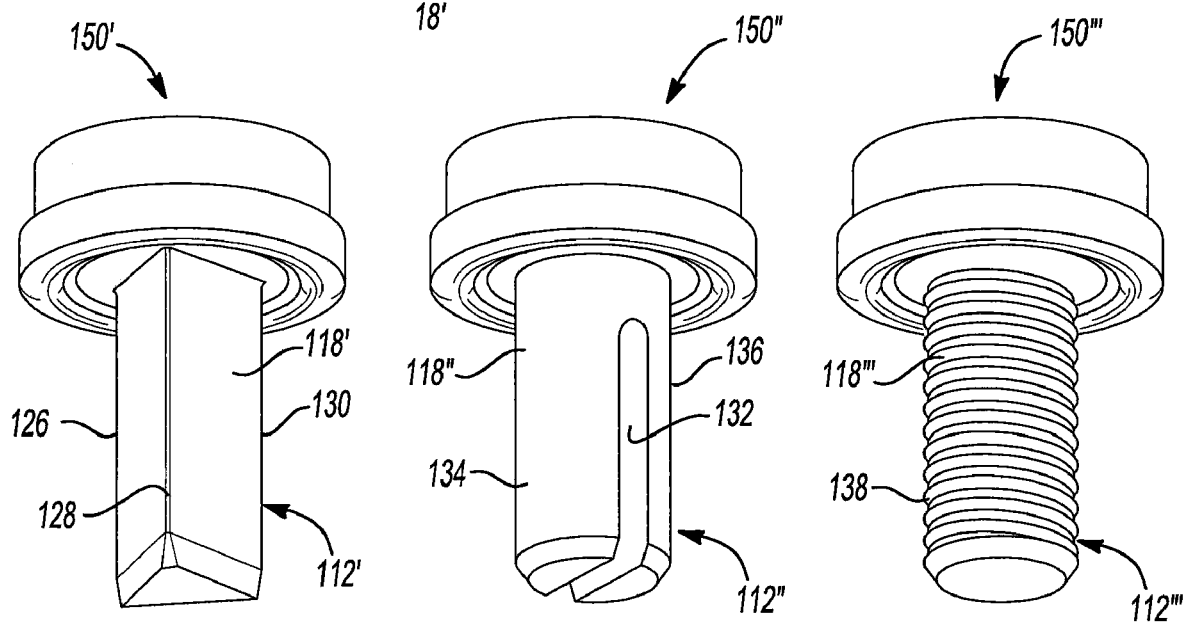
*Fig-3*   *Fig-4*   *Fig-5*

CORE PUSH-IN SEAL

FIELD

The present disclosure relates to valves, and more specifically to seal members for solenoid plungers.

BACKGROUND AND SUMMARY

The statements in this section merely provide background information related to the present disclosure and may not constitute prior art.

Solenoid plunger assemblies requiring a sealing member for engagement with a port to be sealed often require some sort of adhesive to retain the sealing member in position. Using adhesive for coupling sealing members to a solenoid plunger can result in manufacturing issues since the adhesive may escape past a desired location where a coating is not allowed, or may not reliably hold.

According to the present disclosure, a solenoid valve may include a housing, a solenoid coil, and a plunger. The solenoid coil may be disposed about an external portion of the housing and the plunger may be slidably disposed within the housing. The plunger may include a recess in a first end thereof having a seal assembly located and retained therein through a mechanical engagement therewith.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a fragmentary section view of an alternate solenoid plunger assembly according to the present disclosure;

FIG. 3 is a perspective view of an alternate seal member for use in the solenoid valve assembly of FIG. 2;

FIG. 4 is a perspective view of an alternate seal member for use in the solenoid valve assembly of FIG. 2;

FIG. 5 is a perspective view of an alternate seal member for use in the solenoid valve assembly of FIG. 2;

DETAILED DESCRIPTION

Figure 1:
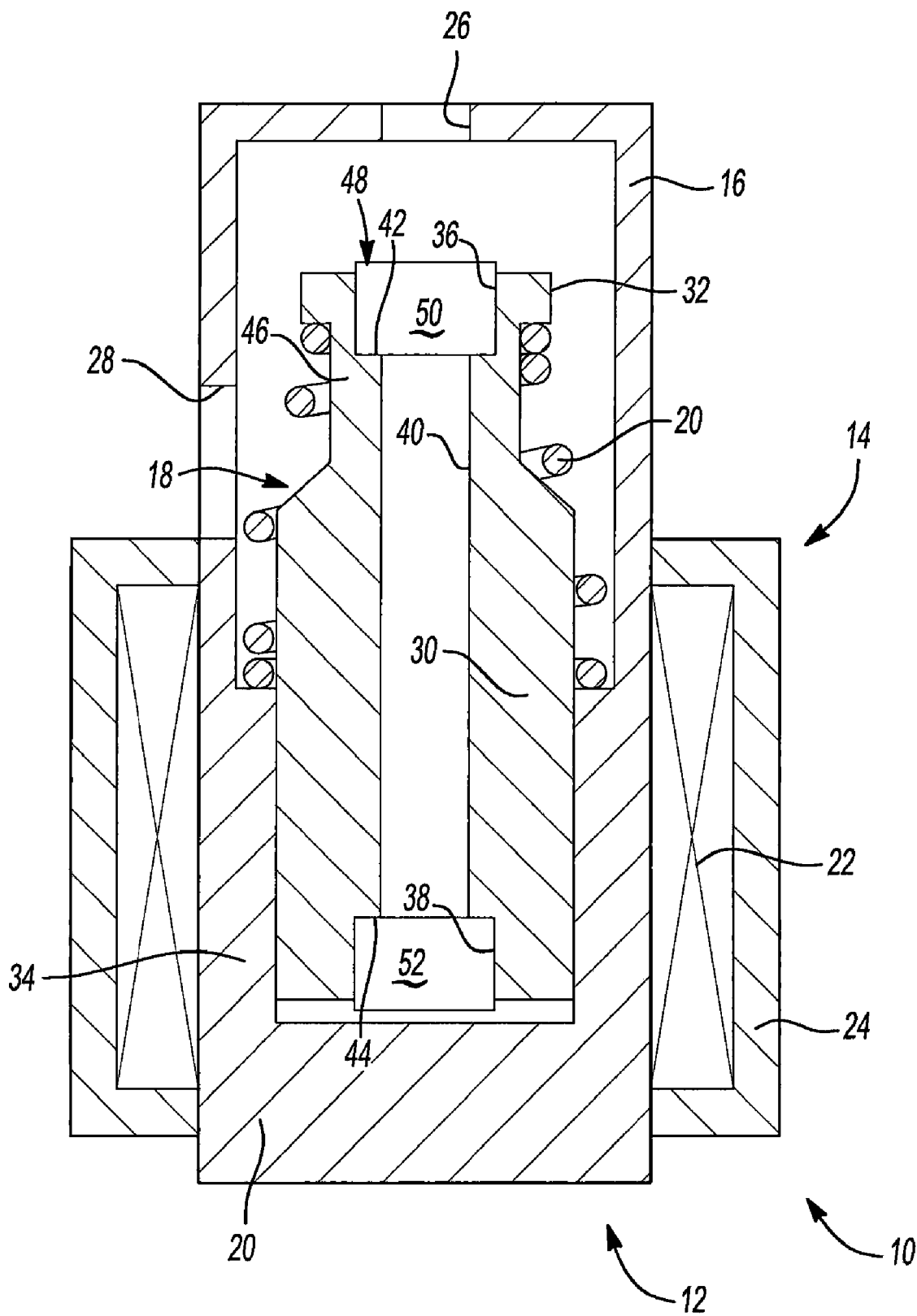
FIG. 1 is a section view of a solenoid valve assembly according to the principles of the present disclosure.

The following description is merely exemplary in nature and is not intended to limit the present disclosure, application, or uses. It should be understood that throughout the drawings, corresponding reference numerals indicate like or corresponding parts and features.

As seen in FIG. 1, a solenoid valve 10 is shown in an open position. Solenoid valve 10 may include a valve assembly 12 and an actuation assembly 14. Valve assembly 12 may include a valve housing 16, a plunger 18, and a biasing member 20. Actuation assembly 14 may include a solenoid coil 22 and a solenoid coil housing 24. Solenoid coil 22 may surround valve housing 16 and may be selectively energized to cause displacement of plunger 18 relative to valve housing 16. Solenoid coil housing 24 may surround solenoid coil 22 providing protection from contamination.

Valve housing 16 may include first and second ports 26, 28 providing for selective communication between first and second fluid paths in a system. Plunger 18 may be slidably disposed within valve housing 16 and may provide selective communication between first and second ports 26, 28. Plunger 18 may be biased in a closed position (not shown) by biasing member 20. Biasing member 20 may take a variety of forms, such as a coil spring.

Plunger 18 may include a body 30 having first and second ends 32, 34 having first and second recesses 36, 38 extending axially therein. A central bore 40 may extend between first and second recesses 36, 38. Central bore 40 may have a diameter that is less than the diameter of first and second recesses 36, 38, forming an annular seat 42, 44 therebetween. Body 30 may include a reduced diameter portion 46 near first end 32. Plunger 18 may further include a seal assembly 48 including first and second seal members 50, 52 retained within first and second recesses 36, 38. Seal members 50, 52 may be mechanically retained within first and second recesses 36, 38 by being molded in place, eliminating the need for an adhesive bond.

With additional reference to FIG. 2, an alternate valve housing 16' may include a seal bead 110. Seal bead 110 may extend around a circumference of a first port 26' in housing 16' and may form a seat for a first seal member 150.

Seal member 150 may include a bolt 112 forming a retention member and an elastomeric member 114. Bolt 112 may have a stiffness substantially greater than a stiffness of elastomeric member 114 and may include a head 116 and a shank 118. Head 116 may include first and second portions 120, 122. First portion 120 may have a first diameter and second portion 122 may have a second diameter generally less than the first diameter, but greater than a diameter of central bore 40'. Second portion 122 may be located between first portion 120 and shank 118, having shank 118 extending from a lower surface thereof. Second portion 122 may form an axial stop for seal member 150 through engagement with annular seat 42'.

Elastomeric member 114 may extend around head 116 and may be mechanically locked thereon. More specifically, elastomeric member 114 may extend around head first portion 120 to an outer circumferential portion of head second portion 122, mechanically locking elastomeric member 114 onto bolt 112. To achieve this engagement, elastomeric member 114 may be integrally molded onto head 116. Elastomeric member 114 may provide a sealed engagement with recess 36' at a radially inner surface thereof through compression of elastomeric member 114 between bolt 112 and recess 36'. Therefore, an adhesive bond is not required between bolt 112 and elastomeric member 114.

Shank 118 may provide additional axial retention of seal member 150 within recess 36'. Shank 118 may include barbs 124 extending radially outwardly therefrom. Barbs 124 may provide engagement between seal member 150 and central bore 40'. Therefore, seal member 150 may be fixed to plunger 18' without the use of an adhesive. As seen in FIGS. 3-5, alternate seal members 150', 150'', 150''' may include different bolt designs 112', 112'', 112'''. As seen in FIG. 3, bolt 112' may include a shank 118' having a generally triangular cross-section. Edges 126, 128, 130 of shank 118' may engage central bore 40' in a manner similar to that of barbs 124 of shank 118 shown in FIG. 2. As seen in FIG. 4, bolt 112'' may include a shank 118'' having a generally cylindrical body with a slot 132 extending centrally along a length thereof, forming first and second legs 134, 136. Legs 134, 136 may provide a radially outward biasing force against a bore, such as bore 40' (shown in FIG. 2). As such, legs 134, 136 may retain seal member 150" within bore 40'. As seen in FIG. 5, bolt 112'" may include a shank 118'" having a generally cylindrical body with a threading 138 thereon generally similar to the threading on a screw. Threading 138 may engage a bore, such as bore 40', when disposed therein, providing for retention of seal member 150'" therein.

Figure 6:
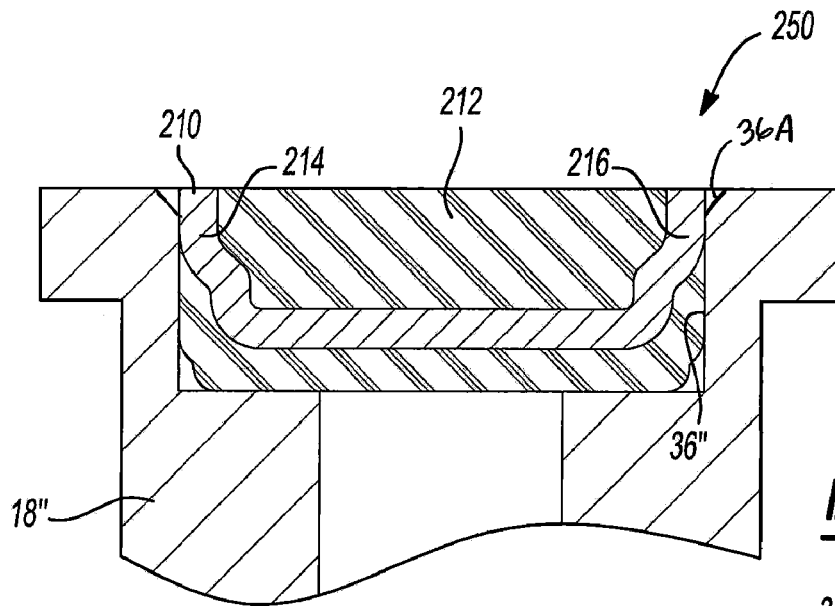
FIG. 6 is a fragmentary section view of an alternate solenoid plunger assembly according to the present disclosure.

With additional reference to FIG. 6, an additional seal member 250 is shown retained in recess 36" of plunger 18". The recess 36" can include a chamfered edge portion 36A for receiving the seal member 250. Seal member 250 may include a retention member 210 and an elastomeric member 212. Retention member 210 may have a stiffness substantially greater than a stiffness of elastomeric member 212. Elastomeric member 212 may be molded around retention member 210, capturing retention member 210 therein without the need for an adhesive. Elastomeric member 212 may provide a sealed engagement with recess 36" at a radially inner surface thereof through compression of elastomeric member 212 between retention member 210 and recess 36". Retention member 210 may have a generally U-shaped cross section with upwardly extending arms 214, 216 providing a radially outward force against recess 36", retaining seal member 250 therein. Therefore, seal member 250 may be fixed to plunger 18" without the use of an adhesive.

Figure 7:
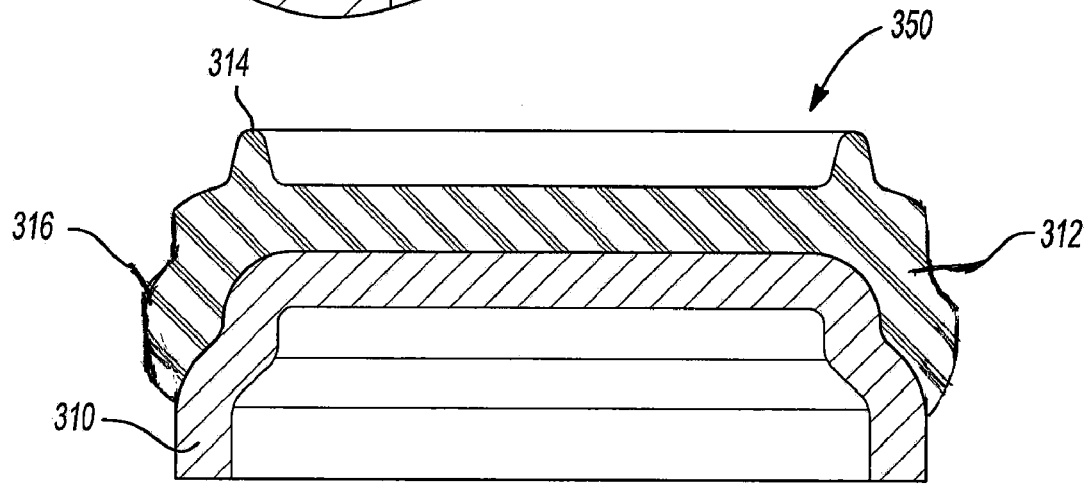
FIG. 7 is a section view of an alternate seal member according to the present disclosure.
Figure 8:
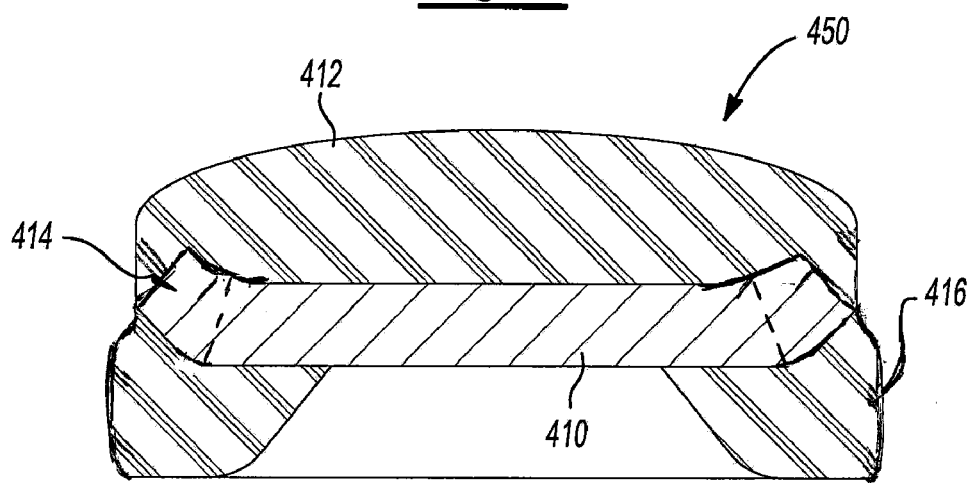
FIG. 8 is a section view of an alternate seal member according to the present disclosure.

Alternate seal members 350, 450, generally similar to seal member 250, are shown in FIGS. 7 and 8. As seen in FIG. 7, seal member 350 may include a retention member 310 and an elastomeric member 312. Retention member 310 may be generally similar to retention member 210, but disposed in an opposite direction, forming an upside-down U-shaped cross-section. Elastomeric member 312 may be generally similar to elastomeric member 212. However, elastomeric member 312 is shown including a sealing bead 314 extending form an upper surface thereof. FIG. 7 additionally shows a radially outwardly extending sealing bead 316 for engagement with a plunger recess. A similar sealing bead may be present in seal members 50, 150, 250. Seal member 450, shown in FIG. 8, may include a retention member 410 and an elastomeric member 412 as well. Retention member 410 may include radially outwardly extending fingers 414 to barb into a plunger recess for retention therein. Elastomeric member 412 may include a radially outwardly extending annular sealing bead 416 for sealing engagement with a plunger recess.

It is understood that the features described in the various examples may be used in combination with the features disclosed in others of the various examples. For example, sealing bead 314 (shown in FIG. 7) of seal member 350 may be used in any of the other seal members 50, 150, 250, 450. It is also understood that the descriptions of the various seal member configurations apply equally to a second seal member such as seal member 50 (FIG. 1). Each of the seal member examples contained herein provides a seal member that may be fixed to a plunger (or valve body) without the use of an adhesive. The seal members may be merely pushed into a mechanical engagement with a plunger recess.

What is claimed is:

1. A valve comprising:
   a housing defining a longitudinal axis;
   a valve body slidably disposed within said housing for selective displacement along said longitudinal axis, said valve body including a recess in a first end thereof; and
   a seal assembly including a retention member and an elastomeric member integrally molded directly onto at least a portion of said retention member, said retention member having a stiffness substantially greater than a stiffness of said elastomeric member and being located within said recess and retaining said seal assembly within said recess through a mechanical engagement between said seal assembly and said recess.

2. The valve of claim 1, wherein said recess extends axially into said end of said valve body.

3. The valve of claim 1, wherein said retention member includes a bolt having a head and a shank, said elastomeric member integrally molded onto said head.

4. The valve of claim 3, wherein said shank includes at least one protrusion extending radially outwardly therefrom and abutting said recess.

5. The valve of claim 1, wherein said retention member provides a radially outward retaining force against said recess.

6. The valve of claim 1, wherein said elastomeric member includes an annular sealing bead formed on an axial end surface thereof.

7. The valve of claim 1, wherein said seal assembly forms a sealed engagement with said recess at a radially inner surface of said recess.

8. The valve of claim 1, wherein said recess includes a longitudinally disposed passageway extending through said first end and a second end of said valve body opposite said first end.

9. The valve of claim 1, wherein said engagement between said seal assembly and said recess is adhesive-free.

10. A solenoid valve comprising:
    a housing;
    a solenoid coil disposed about an external portion of said housing; and
    a plunger slidably disposed within said housing, said plunger including a recess in a first end thereof having a seal assembly located and retained therein, said seal assembly including a retention member and an elastomeric member integrally molded directly onto at least a portion of said retention member, said retention member having a stiffness substantially greater than a stiffness of said elastomeric member and being located within said recess and retaining said seal assembly within said recess through a mechanical engagement between said seal assembly and said recess.

11. The solenoid valve of claim 10, wherein said recess extends axially into an end of said plunger.

12. The solenoid valve of claim 10, wherein said retention member includes a bolt having a head and a shank, said elastomeric member integrally molded onto said head.

13. The solenoid valve of claim 10, wherein said retention member is disposed within said elastomeric member, said retention member providing a radially outward retaining force against said recess.

14. The solenoid valve of claim 10, wherein said seal assembly forms a sealed engagement with said recess at a radially inner surface of said recess.

15. The solenoid valve of claim 10, wherein said recess includes a longitudinally disposed passageway extending through said first end and a second end of said valve body opposite said first end.

16. The solenoid valve of claim 15, wherein said seal assembly includes first and second seal members, said first seal member disposed within said passageway at said first end and said second seal member disposed within said passageway at said second end.

17. The solenoid valve of claim 10, wherein said engagement between said seal assembly and said recess is adhesive-free.

18. A solenoid valve comprising:
- a housing;
- a solenoid coil disposed about an external portion of the housing;
- a plunger slidably disposed within the housing, the plunger defines a recess in an end thereof;
- a seal assembly seated within the recess, the seal assembly includes:
  - a retention member; and
  - an elastomeric member in direct contact with an exterior surface of the retention member;
  - wherein the retention member has a stiffness that is greater than a stiffness of the elastomeric member; and
  - wherein the seal assembly is in mechanical engagement with the recess to retain the seal assembly within the recess.

19. The solenoid valve of claim 18, wherein the elastomeric member surrounds a portion of the retention member.

20. The solenoid valve of claim 18, wherein the elastomeric member is integrally molded directly onto the retention member.

* * * * *